(12) United States Patent
Dougnier et al.

(10) Patent No.: US 9,393,523 B2
(45) Date of Patent: Jul. 19, 2016

(54) METHOD AND SYSTEM FOR PURIFYING THE EXHAUST GASES OF A COMBUSTION ENGINE

(71) Applicant: Inergy Automotive Systems Research (Societe Anonyme), Brussels (BE)

(72) Inventors: Francois Dougnier, Boortmeerbeek (BE); Dominique Madoux, Rumes (BE); Jules Joseph Van Schaftingen, Wavre (BE); Paul Wouters, Vilvoorde (BE)

(73) Assignee: Inergy Automotive Systems Research (Societe Anonyme), Brussels (BE)

( * ) Notice: Subject to any disclaimer, the term of this patent is extended or adjusted under 35 U.S.C. 154(b) by 0 days.

(21) Appl. No.: 14/399,621

(22) PCT Filed: May 10, 2013

(86) PCT No.: PCT/EP2013/059735
§ 371 (c)(1),
(2) Date: Nov. 7, 2014

(87) PCT Pub. No.: WO2013/167738
PCT Pub. Date: Nov. 14, 2013

(65) Prior Publication Data
US 2015/0118132 A1 Apr. 30, 2015

(30) Foreign Application Priority Data

May 9, 2012 (EP) ...................................... 12167220
Dec. 21, 2012 (EP) ...................................... 12199282

(51) Int. Cl.
*B01D 53/94* (2006.01)
*F01N 3/24* (2006.01)
(Continued)

(52) U.S. Cl.
CPC ............ *B01D 53/9431* (2013.01); *B01D 53/90* (2013.01); *B01D 53/9418* (2013.01);
(Continued)

(58) Field of Classification Search
CPC .............. F01N 3/2066; B01D 53/9409; B01D 53/9418
See application file for complete search history.

(56) References Cited

U.S. PATENT DOCUMENTS

| 6,361,754 B1 | 3/2002 | Peter-Hoblyn et al. |
| 8,449,857 B2 * | 5/2013 | Johannessen ...... B01D 53/0454 206/0.7 |

(Continued)

FOREIGN PATENT DOCUMENTS

| CN | 101018597 A | 8/2007 |
| DE | 10 2009 047 338 A1 | 6/2011 |

(Continued)

OTHER PUBLICATIONS

U.S. Appl. No. 14/654,156, filed Jun. 19, 2015, Dougnier, et al.
(Continued)

*Primary Examiner* — Timothy Vanoy
(74) *Attorney, Agent, or Firm* — Oblon, McClelland, Maier & Neustadt, L.L.P

(57) ABSTRACT

An SCR method for purifying the exhaust gases of an internal combustion engine of a vehicle, according to which ammonia gas is exclusively metered in the exhaust gases, the method comprising a step of releasing ammonia gas from at least one solid absorbing matrix where it is stored by sorption and a step of metering the released ammonia gas in the exhaust gases. The method is such that it comprises a step of regenerating the solid absorbing matrix that consists in: generating a refilling ammonia gas by thermally decomposing an ammonia precursor in a heater mounted on board the vehicle; directing the refilling ammonia gas to the solid absorbing matrix where it is stored thereon.

11 Claims, 4 Drawing Sheets

(51) Int. Cl.
*B01D 53/90* (2006.01)
*C01C 1/00* (2006.01)
*C01C 1/08* (2006.01)
*F01N 3/20* (2006.01)

(52) U.S. Cl.
CPC . *C01C1/006* (2013.01); *C01C 1/08* (2013.01); *C01C 1/086* (2013.01); *F01N 3/208* (2013.01); *F01N 3/2066* (2013.01); *B01D 2251/2062* (2013.01); *B01D 2251/2067* (2013.01); *F01N 2240/18* (2013.01); *F01N 2240/22* (2013.01); *F01N 2610/01* (2013.01); *F01N 2610/02* (2013.01); *F01N 2610/06* (2013.01); *F01N 2610/105* (2013.01); *F01N 2610/12* (2013.01); *F01N 2610/1406* (2013.01); *Y02T 10/24* (2013.01)

(56) References Cited

U.S. PATENT DOCUMENTS

| | | | |
|---|---|---|---|
| 9,021,790 B2* | 5/2015 | Boyd | C01C 1/006 60/274 |
| 2006/0117741 A1 | 6/2006 | Mayer et al. | |
| 2008/0066453 A1* | 3/2008 | Oberski | F01N 3/2066 60/286 |
| 2008/0223021 A1* | 9/2008 | Shaikh | F01N 3/2066 60/287 |
| 2010/0062296 A1* | 3/2010 | Johannessen | B01D 53/02 429/515 |
| 2011/0138780 A1 | 6/2011 | Millet et al. | |
| 2012/0045379 A1 | 2/2012 | Johannessen et al. | |
| 2014/0271389 A1* | 9/2014 | Yezerets | B01D 53/90 422/173 |

FOREIGN PATENT DOCUMENTS

| | | | |
|---|---|---|---|
| DE | 10 2009 047 433 A1 | 6/2011 | |
| DE | 102009060288 A1 * | 6/2011 | F01N 3/2066 |
| EP | 2 236 784 A1 | 10/2010 | |
| EP | 2 361 883 A1 | 8/2011 | |
| FR | 2 957 630 A1 | 9/2011 | |
| JP | 2011-226434 | 11/2011 | |
| WO | WO 2004/042207 A1 | 5/2004 | |
| WO | WO 2010/105833 A1 | 9/2010 | |

OTHER PUBLICATIONS

International Search Report issued Oct. 21, 2013, in PCT/EP13/059735 filed May 10, 2013.

European Search Report issued May 24, 2013, in European Patent Application No. 12199282.0 filed Dec. 21, 2012.

* cited by examiner

METHOD AND SYSTEM FOR PURIFYING THE EXHAUST GASES OF A COMBUSTION ENGINE

The present application relates to a method and a system for purifying the exhaust gases of a combustion engine by injecting exclusively ammonia gas, and more particularly ammonia gas that is released from one or several solid absorbing matrices where it is stored by sorption.

Legislation on vehicle and truck emissions stipulates, amongst other things, a reduction in the release of nitrogen oxides $NO_x$ into the atmosphere. One known way to achieve this objective is to use the SCR (Selective Catalytic Reduction) process which enables the reduction of nitrogen oxides by injection of a reducing agent, generally ammonia, into the exhaust line. This ammonia may be obtained by using different techniques. One known technique is based on the use of a solid absorbing matrix where the ammonia is trapped by sorption. Generally, the solid absorbing matrix is stored in a container (or tank) (called hereafter matrix storage container) mounted on the vehicle. According to this known technique, the ammonia is released by heating the solid absorbing matrix, and then the released ammonia is injected into the exhaust line.

This known technique offers high performance since it allows to send pure $NH_3$ in the exhaust gases of the vehicle.

However, the main disadvantage of this known technique is the complexity of the refilling procedure (i.e. the solid absorbing matrix regeneration). Indeed, the actual refilling procedure consists of connecting the matrix storage container to an external ammonia source, typically a highly pressurized cylinder. In this procedure, the matrix storage container has to be dismounted from the vehicle for ammonia loading. Moreover, sending a high pressure of ammonia in the solid matrix results in a huge heat generation due to exothermal sorption reaction (tens of thousands J/mol $NH_3$, as a likely order of magnitude), hence the need of a cooling unit as heat sink. High temperature can damage parts of the system and induce long regeneration time.

In view of the above-mentioned disadvantage, there exists a need for an improved method for the regeneration of the solid absorbing matrix.

An object of the present invention is to solve this above-mentioned problem by proposing an SCR method for purifying the exhaust gases of an internal combustion engine of a vehicle, according to which ammonia gas is exclusively metered in the exhaust gases, the method comprising a step of releasing ammonia gas from at least one solid absorbing matrix where it is stored by sorption and a step of metering the released ammonia gas in the exhaust gases. According to one aspect of the present invention, the method comprises a step of regenerating the solid absorbing matrix that consists in:
- generating a refilling ammonia gas by thermally decomposing a ammonia precursor in a heater mounted on board the vehicle;
- directing the refilling ammonia gas to the solid absorbing matrix where it is stored thereon.

Thus, it is proposed an in situ regeneration procedure. In other words, the regeneration of the solid absorbing matrix takes place on board the vehicle. More precisely, the regeneration procedure according to the invention is based on the decomposition of an ammonia precursor. Such decomposition is obtained by using a heater mounted on board the vehicle. This decomposition results in the generation of a refilling ammonia gas. The refilling ammonia gas is then directed (i.e. transmitted) to the solid absorbing matrix where it is stored thereon. According to the invention, no external ammonia source is used and no disassembly manual operations are needed for the regeneration of the solid absorbing matrix(ces). Thus, the regeneration procedure according to the invention is simple, faster and safer. In addition, the safety of the system is increased since the quantity of ammonia stored in the solid absorbing matrix can be very limited.

In a preferred embodiment, a predetermined amount of ammonia precursor is stored on board the vehicle. For example, during vehicle (engine) operation, it is calculated a desired amount of ammonia precursor to be injected into the heater. Such calculation can be made as a function of information relative to the amount of ammonia gas that has been injected into the exhaust line. In a particular embodiment, such information may derive from data provided by a temperature sensor, a pressure sensor or a flow meter, or any combination of these sensors. In another particular embodiment, such information may derive from data provided by a device configured to measure the concentration of ammonia stored in the solid absorbing matrix. In another particular embodiment, this information may be derived from an estimation of the consumption of ammonia.

The SCR method according to the present invention is aiming at injecting exclusively ammonia gas in the exhaust gases. In other words, no ammonia precursor is injected in the exhaust gases.

In a particular embodiment, the ammonia precursor is an aqueous urea solution.

The terms "urea solution" are understood to mean any, generally aqueous, solution containing urea. The invention gives good results with eutectic water/urea solutions for which there is a quality standard: for example, according to the standard ISO 22241, in the case of the AdBlue® solution (commercial solution of urea), the urea content is between 31.8% and 33.2% (by weight) (i.e. 32.5+/−0.7 wt %) hence an available amount of ammonia between 18.0% and 18.8%. The AdBlue® supply network is well deployed in many countries, what makes this ammonia precursor particularly attractive. The invention may also be applied to the urea/ammonium formate mixtures, also in aqueous solution, sold under the trade name Denoxium™ and of which one of the compositions (Denoxium-30) contains an equivalent amount of ammonia to that of the AdBlue® solution. The latter have the advantage of only freezing from −30° C. onwards (as opposed to −11° C.), but have the disadvantages of corrosion problems linked to the possible release of formic acid. The invention can also apply to guanidinium formate. The present invention is particularly advantageous in the context of eutectic water/urea solutions, which are widely available in gas stations.

According to the invention, no urea solution is injected in the exhaust gases. There is no line (or conduit) for transporting the urea solution up to the exhaust line and there is no metering device for injecting the urea solution in the exhaust gases. According to the invention, the urea solution is exclusively transported to the heater, where it is thermally decomposed to generate the refilling ammonia gas.

In a particular embodiment, the urea solution can be partially stored in a chamber located within the heater, before it is thermally decomposed.

In another particular embodiment, the solid absorbing matrix is stored in a first tank and the ammonia precursor is stored in a second tank. Advantageously, the second tank (storing the ammonia precursor) is connected in a communicating manner to said heater, and said heater is connected in a communicating manner to the first tank (storing the solid absorbing matrix). In a first embodiment, the first tank and the second tank can be separate storage tanks. In a second embodiment, the first tank and the second tank can be two separate chambers of a same container.

It should be noted that it exists well known refilling standards and systems for ammonia precursor, in particular for the AdBlue® solution (commercial solution of urea). The refilling of the storage tank of the ammonia precursor is trivial. For example, this can be achieved by using available standard-designed nozzle and/or bottles with dedicated interfaces.

In a particular embodiment, the heater can be located below the storage tank of the ammonia precursor. In another particular embodiment, the heater can also be located at the bottom of the storage tank of the ammonia precursor. In these particular embodiments, a stream (i.e. part) of the ammonia precursor can be transported towards the heater by gravity.

According to the invention, if the ammonia precursor generates water by thermal decomposition, this water is separated from the ammonia, collected and preferably prevented from being stored on the solid absorbing matrix. Separation of the water from the ammonia, and generally from the eventual other thermal decomposition products (generally gases like $CO_2$), can be made using a condenser or one or several membranes like disclosed in U.S. Pat. No. 4,758,250 for instance, which is a polymeric membrane. The condenser may be a specific one comprising a specific shaped tube having different parts at different temperatures (as described in example 2 below); a phase change material, or any other means for cooling and condensing the gases. Alternatively, the condenser may be part of a device already onboard the vehicle, for instance: part of the vehicle air conditioning system.

The water collected may be vaporised in the exhaust gases and/or at least part of it can be stored for instance to be available for dissolving excess ammonia that would pressurize unduly the storage tank of the solid absorbing matrix (see embodiment with pressure relief valve described below).

The ammonia is metered using a gas line which may comprise a non return valve close to the metering point.

The method according to the invention uses two separate storage tanks: one for the ammonia precursor and one for the solid absorbing matrix which stores ammonia by sorption. As described in patent application WO 2006/012903, metal amine salts (preferably alkaline earth metal chlorides) can be used as solid storage media for ammonia.

In order to perform the thermal steps of the method of the invention (generation of the refilling ammonia gas, thermal desorption from the solid absorbing matrix, the case being), resistive heating elements may be used. These resistive heating elements may be metallic heating filaments (wires), flexible heaters, (that is to say heaters comprising one or more resistive track(s) affixed to a film or placed between two films (that is to say two substantially flat supports, the material and thickness of which are such that they are flexible)) or any other type of resistive elements that have a shape, size and flexibility suitable for being inserted into and/or wound around the components of the SCR system. PTC (Positive Temperature Coefficient) elements are more particularly suitable for heating.

In a preferred embodiment of the invention, at least the thermal decomposition of the ammonia precursor in the heater is performed using the dissipated heat of the engine (for instance, a flow of the liquid engine cooling system) and/or exhaust line (gases). For example, the formation of an adequate quantity of ammonia to be stored on the solid absorbing matrix (i.e. the quantity required to operate the SCR system until enough ammonia from the precursor decomposition is available) by thermal decomposition of a stream (i.e. part) of ammonia precursor in the heater can be performed during vehicle operation and eventually extended after engine stop, preferably also using the dissipated heat of the engine and/or exhaust line for example to evaporate water, the case being. Thus, at next engine start, the necessary amount of ammonia gas for SCR operation is readily available due to the rapid desorption of ammonia stored on the solid absorbing matrix.

The thermal decomposition of the ammonia precursor in the heater may be induced at a constant temperature. Alternatively, in the case of a precursor solution, said solution may first be heated in contact with a heating device at a first temperature (for example, in the 40° C.-100° C. range), for water to evaporate until the ammonia precursor reaches a solid state. The heating device is then heated at a second temperature (for example in the range 50° C.-500° C.) at which the solid ammonia precursor is decomposed with the generation of ammonia gas. When heating the solid absorbing matrix to release ammonia, it can be that too high ammonia pressure build up occurs inside the system, due to thermal inertia or to a potential failure of the heating power regulation. In order to release the pressure above a given set-point, the excess of gaseous ammonia is preferably released by a security valve and either directly returned to the ammonia precursor tank (preferred embodiment in the case of a solid ammonia precursor), or first dissolved in an adequate amount of water, for instance coming from the evaporation of the precursor solution the case being, and stored on purpose, and at a composition involving an amount of available ammonia identical to the one of the precursor solution (preferred embodiment in the case of urea precursor solutions). In another preferred embodiment, the excess of ammonia released can merely be dissolved in water and the ammonia solution so obtained can be used later on for thermal ammonia generation and storage on the solid absorbing matrix.

The present invention also concerns a system for applying the SCR method as described above, said system comprising:
  a first tank mounted on board a vehicle and storing at least one solid absorbing matrix where ammonia is stored by sorption,
  means for metering ammonia gas released from the solid absorbing matrix, in the exhaust gases,
  means for directing a stream of ammonia precursor solution to a heater mounted on board the vehicle and allowing the thermal decomposition of said stream to generate a refilling ammonia gas
  means for directing the refilling ammonia gas to the solid absorbing matrix stored in the first tank.

Preferably, the storage tank for the solid absorbing matrix comprises or is connected to a pressure release valve as described above.

The heater can be a chamber containing a heating device like a resistive heating element, and/or being in contact with a heat flux available on the vehicle as set forth above. More generally, the heater is a chamber whose temperature is controlled within predetermined ranges; in case the predetermined range falls below the temperature of the environment, cooling means will also be made available within the heater. In other words, the heater can either be controlled so as to rise up the temperature within the chamber or controlled so as to cool down the temperature within the chamber.

The means for directing the stream of ammonia precursor solution to the heater generally comprise a pipe, a valve and eventually a pump, although if the heater is located below the storage tank of the ammonia precursor solution, the stream can merely be generated by gravity.

The means for separating the water from the ammonia may be a condenser and/or a membrane as set forth above.

The means for directing the refilling ammonia gas to the storage tank of the solid storage absorbing matrix may be a simple tube (pipe) and said refilling ammonia gas may be mixed with other gaseous decomposition product(s) like $CO_2$ for instance.

In one embodiment, the system of the invention also comprises a pressure relief valve enabling to release pressure above a given set point in the storage tank of the solid absorbing matrix. Preferably, it also comprises means for dissolving the gases so released into a given amount of water and means for returning the so obtained solution to the storage tank of an ammonia precursor solution.

The present invention is illustrated in a non limitative way by the examples below relying on FIGS. 1 to 3 attached. In these figures, identical or similar devices bear identical reference numbers.

EXAMPLE 1

Figure 1:
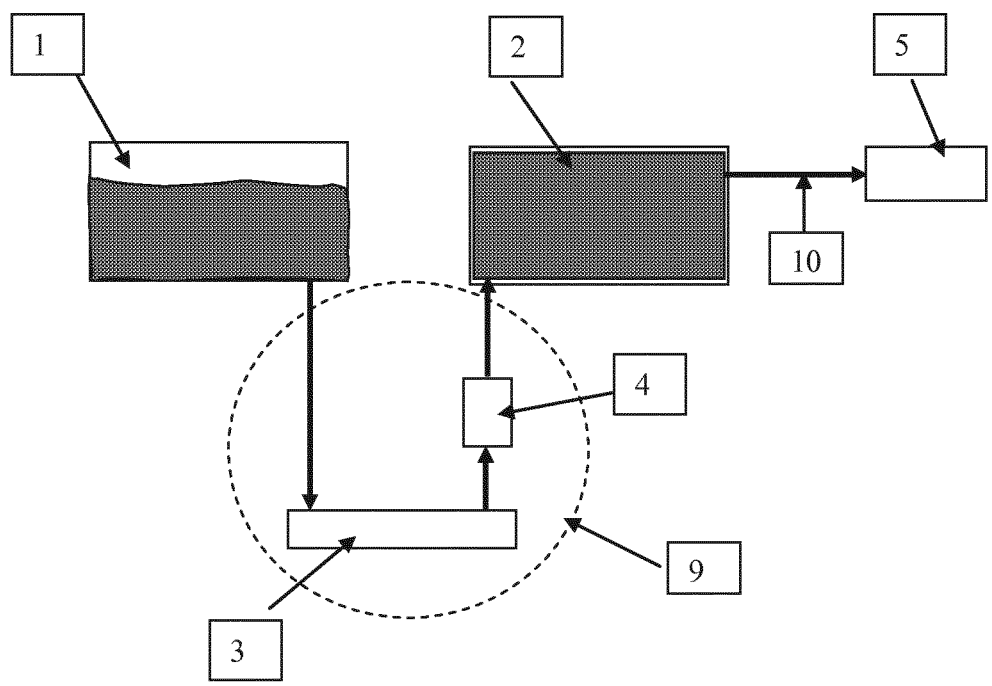
FIG. 1 is a schematic view of a SCR system according to an embodiment of the invention.

FIG. 1 is a schematic view of a SCR system according to a particular embodiment of the present invention.

As illustrated in FIG. 1, a liquid solution of an ammonia precursor is stored in a tank [1] and a solid absorbing matrix is stored in a tank [2]. The tank [1] and the tank [2] are connected together in a communicating manner via a communication line [9]. The communication line [9] comprises a heater [3] and a condenser [4].

Figure 4:
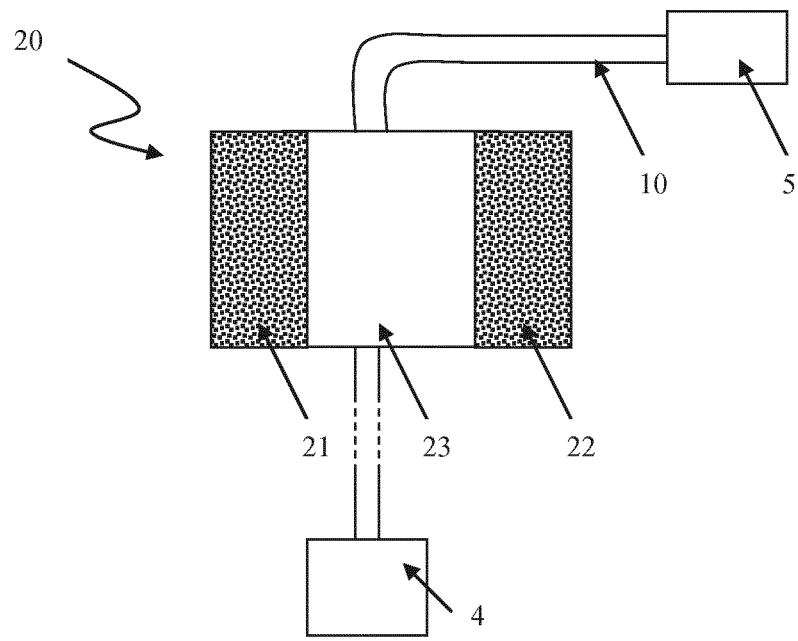
FIG. 4 is a schematic view of a tank according to an example of the invention.

FIG. 4 is a schematic view of the tank [2] according to a particular embodiment of the present invention. As illustrated in this example, the tank [2] comprises one cell [20]. The cell [20] comprises two chambers [21] and [22], each containing a solid absorbing matrix. The chambers can contain similar or distinct type of solid absorbing matrix. The chambers [21] and [22] are separated by a gas flow channel [23]. The ammonia gas released from the solid absorbing matrices (contained in the chambers [21] and [22]) and (eventually) the refilling ammonia gas (generated by the decomposition unit) can flow through the channel [23] towards the condenser [4]. Of course, in another embodiment the cell [20] can comprise one or more than two chamber(s).

According to another particular embodiment of the present invention, the tank [2] can comprise a plurality of cells connected in series and/or in parallel.

Figure 5:
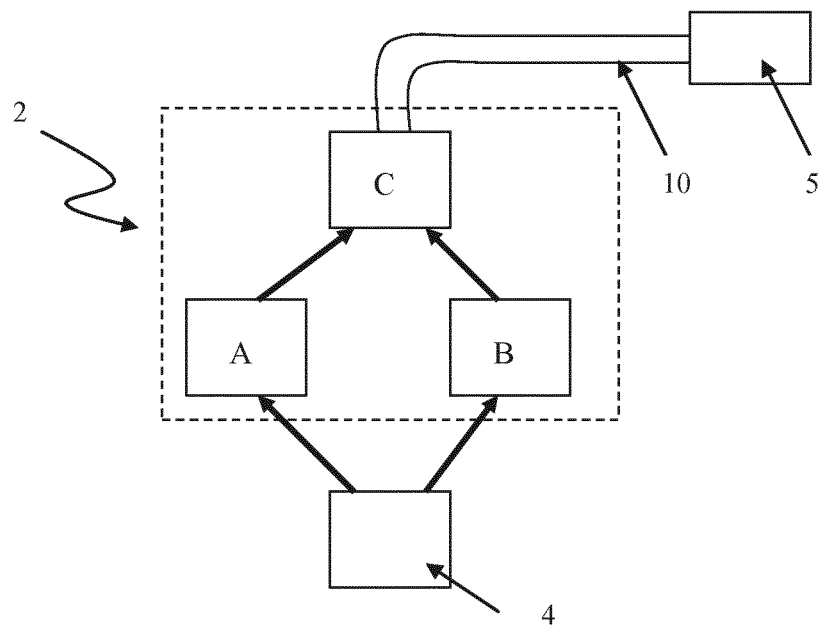
FIG. 5 is a schematic view of a tank according to a further example of the invention.

FIG. 5 is a schematic view of the tank [2] according to another particular embodiment of the present invention. As illustrated in this example, the tank [2] comprises three cells (A, B, C) containing, for example, solid materials showing different ammonia sorption properties. The tank [2] is based on a two-stage unit. The first stage comprises the cells A and B, and the second stage comprises the cell C. For example, the cells A and B are filled with magnesium chloride and the cell C is filled with calcium chloride or barium chloride. One magnesium chloride-filled cell (for example, cell A) is used for the absorption of ammonia generated by the decomposition unit [3] (i.e heater) while the second one (for example, cell B), previously saturated with ammonia (coming from the decomposition unit [3]), is used to provide ammonia gas which is further absorbed in the cell C. When the cell A is ammonia saturated and the cell B is empty, the roles of cells A and B are reversed. This two-stage unit combines the enhanced absorption properties of one matrix material (for example, magnesium chloride) for ammonia capture, and the advantage of the desorption properties of a second matrix material (for example, calcium chloride or barium chloride) to make ammonia readily available for the selective catalytic reduction (i.e. purification of the exhaust gases).

The SCR system of the invention is designed to exclusively inject ammonia gas ($NH_3$) in the exhaust gases. Thus, the SCR system of the invention is simple and efficient, since only pure $NH_3$ is sent in the exhaust gases.

As illustrated in FIG. 1, the tank [2] is connected to the exhaust pipe [5] via an injection line [10] configured to transport exclusively ammonia gas. According to one aspect of the invention, ammonia gas ($NH_3$) released from the solid absorbing matrix flows through the injection line [10] and is metered in the exhaust pipe [5].

According to another aspect of the invention, no liquid solution is injected in the exhaust pipe [5]. As illustrated in FIG. 1, there is no line (or pipe) for transporting the liquid solution stored in tank [1] up to the exhaust pipe [5]. The liquid solution is exclusively transported to the heater [3], where it is thermally decomposed to generate the refilling ammonia gas for the solid absorbing matrix stored in tank [2].

The liquid solution stored in tank [1] is preferably a 32.5% urea solution commercially available under the brand name Adblue®, but other soluble ammonia compounds (like ammonium carbamate or guanidinium formate) are also suitable. A stream (i.e. part) of the solution comes in contact with the heater [3], where water evaporation and urea decomposition occur. The water is further separated in the condenser [4], and the remaining gaseous flow (i.e. the refilling ammonia gas) goes through the tank [2] where ammonia is trapped on the solid absorbing matrix.

In a particular embodiment, for example when the solid absorbing matrix is saturated with ammonia, a stream (i.e. part) or all of the refilling ammonia gas can flow through the injection line [10] and can be metered in the exhaust pipe [5]. In this particular embodiment, the stream or all of the refilling ammonia gas can flow through the solid absorbing matrix, i.e. the stream or all of the refilling ammonia gas is not trapped on the solid absorbing matrix.

The heat source of the heater [3] can be derived from a hot part of the vehicle, and is preferably a section of the exhaust line. Alternatively, the heater can also be electrical. The temperature range is 40° C.-500° C. If necessary, the ammonia precursor solution can be sprayed on the heating device. As regards the content of the tank [2], any material showing ammonia sorption properties is convenient; however, a matrix containing alkaline earth metal chloride is particularly adapted. The excess of carbon dioxide is either trapped in the condensed water or released in the exhaust pipe [5], when the pressure inside the tank [2] reaches a pre-set level. In vehicle operation, ammonia is desorbed from the solid which is stored in the tank [2], and carried to the exhaust line [5], upstream of the SCR catalyst. The condensed water can be further vaporized in the exhaust line of the vehicle.

EXAMPLE 2

Figure 2:
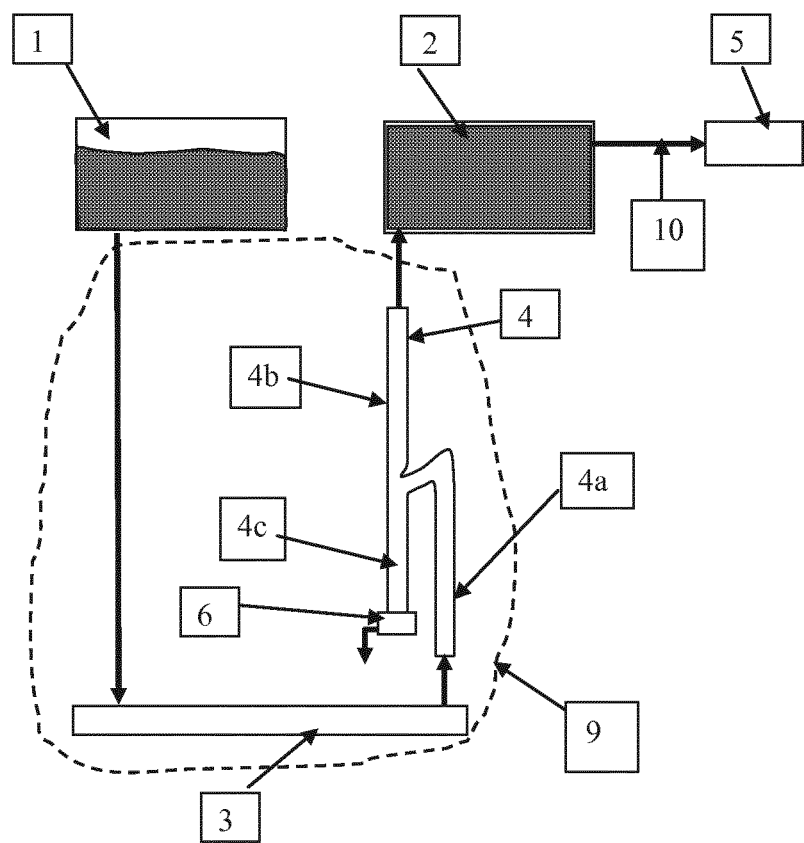
FIG. 2 is a schematic illustrating a condenser according to an embodiment of the invention.

This example, relying on FIG. 2 attached, illustrates the case in which the condenser [4] is made of a shaped tube. The tank [1] is filled with a urea solution. The gas flow resulting from the water evaporation and the urea decomposition goes through the inlet part [4a] of the condenser. Water vapors are condensed in part [4b] of the device, having a temperature lower than part [4a]. Liquid water is further collected in part [4c], and is removed by opening the valve [6]. Ammonia vapor goes to tank [2] through the outlet of the part [4b] of the condenser.

EXAMPLE 3

In this case, the solution of the ammonia precursor of example 1 is heated in contact with the heating device at a first temperature (for example, in the 40° C.-100° C. range), for water to evaporate. The ammonia precursor reaches a solid state. The heating device is then heated at a second temperature (for example in the range 50° C.-500° C.) for which the solid ammonia precursor is decomposed with the generation of ammonia gas.

EXAMPLE 4

In this example, the condenser of example 1 is removed and the water/gas separation is made effective by using a membrane or a series of membranes at the outlet of the heating device.

EXAMPLE 5

In this case, tank [1] is filled with a solid state ammonia precursor, for example: urea or ammonium carbamate, in the form of powder, pellets or flakes. A stream (part) of the solid is drawn to the heater where ammonia is generated, and further trapped in a solid material in the tank [2]. No separator device (water condenser, for example) is needed in this example.

EXAMPLE 6

Figure 3:
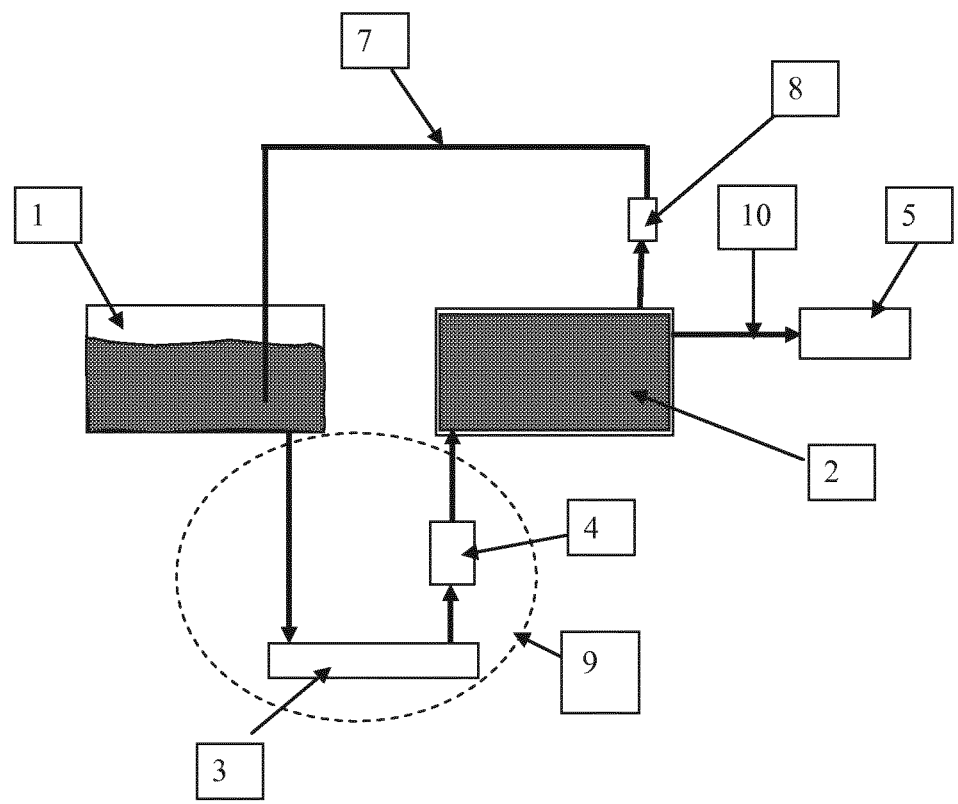
FIG. 3 is a schematic illustrating a pressure safety function of a tank according to an example of the invention.

In this example, relying on FIG. 3, a pressure safety function of tank [2] is described in this example. When pressure build up inside the tank [2] is higher than a set value, the pressure valve [8] is open, and the ammonia gas flows to the tank [1], through the line [7]. Ammonia is further dissolved in the solution which is stored in the tank [1].

In a preferred embodiment, which is not illustrated in FIG. 3, line [7] does not return ammonia directly to tank [1] but instead, it conveys it first to a chamber/tank where it is dissolved in an appropriate amount of water so as to reach the right composition (preferably having the same amount of available ammonia as the solution in tank [1] and the urea solution so obtained is then sent to tank [1].

This can be done for instance by storing a given amount of water in the chamber, by deducing the amount of ammonia released from the pressure difference since the beginning of the pressure release and by returning the solution to the tank when the right ammonia concentration is reached.

The invention claimed is:

1. A SCR or Selective Catalytic Reduction method for purifying the exhaust gases of an internal combustion engine of a vehicle, according to which ammonia gas is exclusively metered in the exhaust gases, the method comprising a step of releasing ammonia gas from at least one solid absorbing matrix where it is stored by sorption and a step of metering the released ammonia gas in the exhaust gases, wherein the method comprises a step of regenerating the solid absorbing matrix that consists in:
   generating a refilling ammonia gas by thermally decomposing a ammonia precursor in a heater mounted on board the vehicle;
   directing the refilling ammonia gas to the solid absorbing matrix where it is stored thereon,
   wherein a first tank in which the solid absorbing matrix is stored is connected to a security valve configured to release the excess of gaseous ammonia in order to release the pressure above a given set-point,
   wherein the ammonia precursor is stored in a second tank and is an aqueous solution of urea, and
   wherein the excess of gaseous ammonia released by the security valve is first dissolved in an adequate amount of water before being returned to the ammonia precursor tank.

2. The SCR method according to claim 1, wherein a stream of the refilling ammonia gas is metered in the exhaust gases.

3. The SCR method according to claim 1, and wherein the second tank is connected in a communicating manner to said heater, and said heater is connected in a communicating manner to the first tank.

4. The SCR method according to claim 1, wherein it comprises a step of separating water from the refilling ammonia gas by means of a condenser or at least one membrane.

5. The SCR method according to claim 1, wherein the ammonia precursor is an aqueous urea solution.

6. The SCR method according to claim 5, wherein the ammonia precursor is a eutectic water/urea solution.

7. The SCR method according to claim 1, wherein the thermal decomposition of the ammonia precursor in the heater is performed using the dissipated heat of the engine and/or exhaust gases.

8. The SCR method according to claim 1, wherein the thermal decomposition of ammonia precursor is performed in the heater during vehicle operation and extended after engine stop.

9. A system for applying an SCR method according to claim 1, said system comprising:
   a first tank mounted on board a vehicle and storing at least one solid absorbing matrix where ammonia is stored by sorption,
   means for metering ammonia gas released from the solid absorbing matrix, in the exhaust gases,
   a second tank to store an ammonia precursor,
   means for directing a stream of ammonia precursor solution to a heater mounted on board the vehicle and allowing the thermal decomposition of said stream to generate a refilling ammonia gas
   means for directing the refilling ammonia gas to the solid absorbing matrix stored in the first tank,
   a pressure relief valve enabling to release pressure above a given set point in the storage tank of the solid absorbing matrix,
   means for dissolving the gases so released into a given amount of water, and
   means for returning the so-obtained solution to the storage tank of an ammonia precursor solution.

10. The system according to claim 9, comprising a second tank mounted on board the vehicle and storing said ammonia precursor solution.

11. The system according to claim 9, comprising means for separating the water from the ammonia.

* * * * *